United States Patent [19]

Jard

[11] Patent Number: 4,953,395
[45] Date of Patent: Sep. 4, 1990

[54] TIRE PRESSURE INDICATOR

[76] Inventor: James E. Jard, 508 W. Holly Rd., Virginia Beach, Va. 23451

[21] Appl. No.: 471,665

[22] Filed: Jan. 24, 1990

Related U.S. Application Data

[63] Continuation-in-part of Ser. No. 206,666, Jun. 15, 1988, abandoned.

[51] Int. Cl.⁵ .............................................. B60C 73/02
[52] U.S. Cl. ................................................... 73/146.8
[58] Field of Search .................. 73/146.8, 146.5, 146.4, 73/146.2

[56] References Cited

U.S. PATENT DOCUMENTS

| | | | |
|---|---|---|---|
| 1,216,192 | 2/1917 | Weinandt | 73/146.3 |
| 2,168,145 | 8/1939 | Willis | 73/146.3 |
| 2,213,949 | 9/1940 | Brown | 73/146.4 |
| 2,800,795 | 7/1957 | Trinca | 73/146.3 |
| 3,719,159 | 3/1973 | Davis | 73/146.3 |
| 4,581,925 | 4/1986 | Crutcher | 73/146.8 |

FOREIGN PATENT DOCUMENTS

412375  6/1934  United Kingdom ............. 301/37 H

*Primary Examiner*—Donald O. Woodiel

[57] ABSTRACT

Tire pressure indicator at centerline of wheel is secured to wheel rim by wheel rim-mounting studs and nuts. Pneumatic conduit extends from pressure indicator to tire's valve stem. Modified hub cap conceals conduit and mounting hardware. Hinged cover on hub cap opens of expose dial-or digital-type pressure indicator.

11 Claims, 7 Drawing Sheets

TIRE PRESSURE INDICATOR

This application is a continuation-in-part of application Ser. No. 07/206,666, filed June 15, 1988, now abandoned.

FIELD OF INVENTION

The present invention relates to tire pressure indicating gauges, particularly wheel-mounted tire pressure gauges.

BACKGROUND OF PRIOR ART

It is well known that improper automobile tire inflation causes accelerated and uneven tire wear, and increses the risk of tire blow outs which, in turn, presents a traffic safety hazard. Such problems can often be eliminated by monitoring of the tire's pressure and, accordingly, by inflating the tire to the proper pressure.

Many prior methods for measuring automobile tire pressure are known. Such prior devices are generally of three types, namely: (1) a detached pressure gauge which may be temporarily connected to the valve stem of a non-moving tire for purposes of reading tire's pressure; (2) a remote-reading gauge system which has a pressure sensing device which constantly senses tire pressure in communication with a remote indicator (typically in the automobile's dashboard) which allows either constant or intermittant tire pressure monitoring from inside the automobile; and (3) a tire pressure gauge or indicator permanently attached to the tire's valve stem by which the tire pressure can be read directly when the tire is not moving. The present invention is of the latter type of pressure measuring devices.

Prior device which are in permanent communication with a tire's valve stem typically have the indicator component mounted at or near the valve stem and, as such, are typically off-center relative to the tire itself. Because these prior devices are off-center (relative to the tire and the automobile's axle they must be designed to endure high centrifugal forces which may be encountered when the automobile moves. Such high forces can be destructive to the device as well as to the automobile.

Another problem of such prior devices is that, in the event the device becomes detached from the valve stem while the automobile is in motion, the device may become a high velocity projectile and thus present a safety hazard.

Another problem of such prior devices is that, because of the eccentricity of the load that they add to the tire, the automobile's tire may become unbalanced, thus presenting a safety problem and causing an uneven and unsafe ride for the automobile's passengers.

Another problem of such prior devices is that, because of the undesired side-effects relating to a large eccentric load, these devices are typically designed to be very small—often too small for the gauge itself to be read.

For this same reason such pressure indicating devices are typically linear gauges, in which the pressure is read on an extension rod of a displaced pressure sensing piston. Such linear gauges are typically difficult to read. Because alternative indicators, for example, dial gauges and digital gauges, are typically larger and/or heavier than these prior (linear) devices, and because they would effect an even larger eccentric load, prior devices typically do not comprise dial gauges or digital gauges.

OBJECTS

Accordingly, the primary object of the present invention is to provide a tire pressure sensing and indicating device by which the pressure of an automobile tire can be read.

Another object of the present invention is to provide a device of the character described in which the tire pressure sensing device is attachable to the valve stem of common automobile tires.

Another object of the present invention is to provide a device of the character described in which the tire pressure sensing and indicating device may remain attached to the tire's valve stem while the tire is in motion.

Another object of the present invention is to provide a device of the character described which introduces minimal eccentric loads to the tire.

Another object of the present invention is to provide a device of the character described in which the tire pressure indicating device is located at the center line of the automobiles axle.

Another object of the present invention is to provide a device of the character described in which the pressure indicating device is either a dial gauge or a digital gauge.

Another object of the present invention is to provide a device of the character described in which the gauge is protected from damage by debris.

Another object of the present invention is to provide a device of the character described which can be attached to existing automobile wheels and tires without modification of the wheels or tires.

Another object of the present invention is to provide a device of the character described which can be securely fastened to the rim of a tire and in a manner that prevents theft of the device.

Further objects and advantages of this invention will become apparent from a consideration of the drawings and ensuing description thereof.

DESCRIPTION

Figure 4:
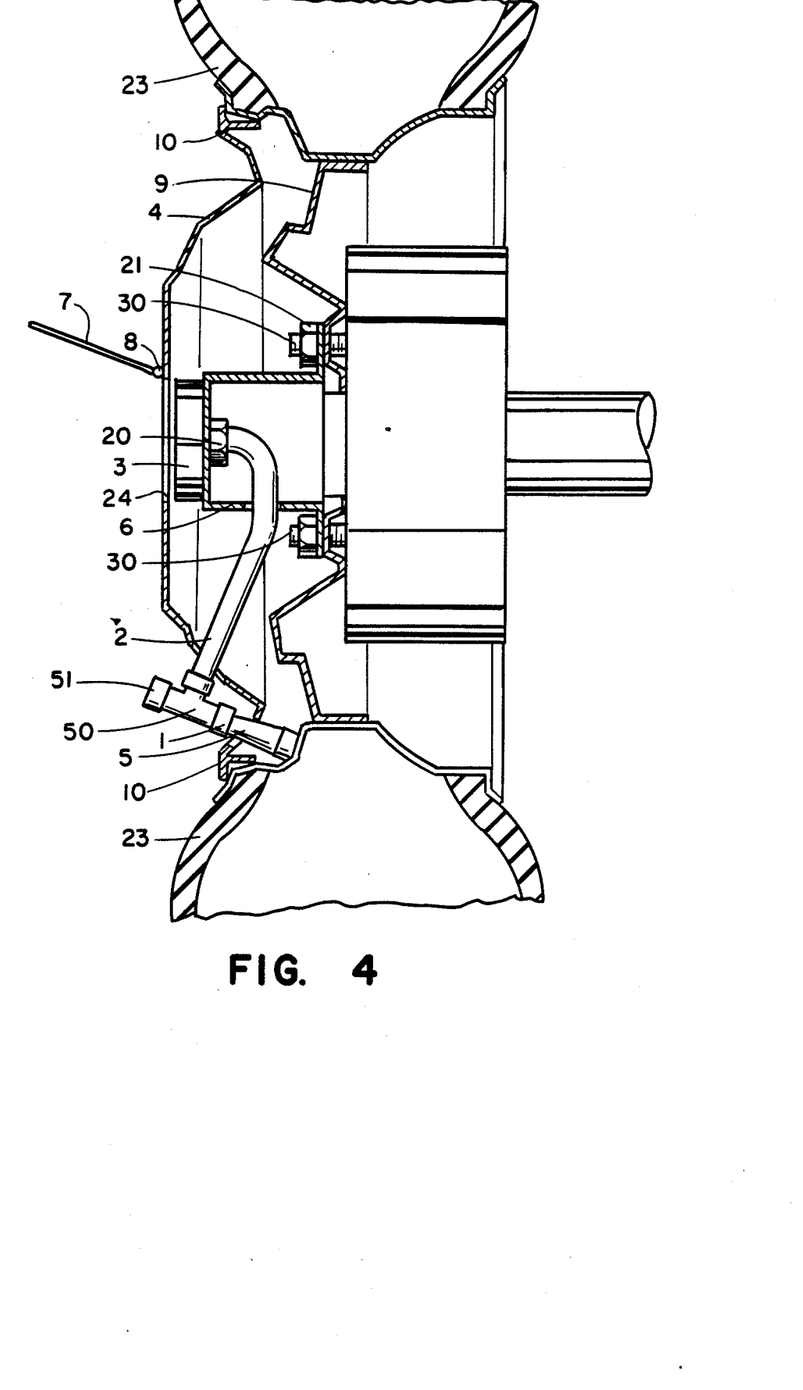
FIG. 4 is a diametrical cross section of a tire and wheel assembly embodying a modification of the present invention.

In the preferred embodiment of the invention pressure indicating gauge (3) is in communication with an automobile tire valve stem (5) via a pneumatic hose (2). Hose (2) is attachable to valve stem (5) by female fitting (1) which is permanently attached to hose (2). Pressure indicating gauge (3) is housed inside of hub cap (4). Gauge (3) is secured to mounting bracket (6) by nut (20). Mounting bracket (6) is secured to tire rim (9) by nuts (21) and studs (30) which also secure the tire rim (9) to the automobile's wheel (22). Hose (2) may also be provided with a supplemental valve stem (50) and a removable cap (51), as shown inn FIG. 4, through which additional pressurized air may be introduced into the hose (2) and tire (23) without necessitating the removal of fitting (1) from the tire's valve stem (5).

In the preferred embodiment of the invention cover (7) is attached to hub cap (4) by spring loaded hinges (8). Access is gained to the gauge (3) by opening cover (7). In the preferred embodiment of the invention hub cap (4) is secured to the automobile's tire rim (9) by common hub cap mounting means such as a spring lip (10) at the perimeter of the hub cap (4). However, any common means of securing the hub cap (4) to the tire rim (9) may be used. An opening (11) is provided form the outside of the hub cap (4) to the inside of the hub cap (4) through which hose (2) passes from valve stem (5) in front of the hub cap (4) into the back of gauge (3) behind the hub cap (4).

Figure 1:
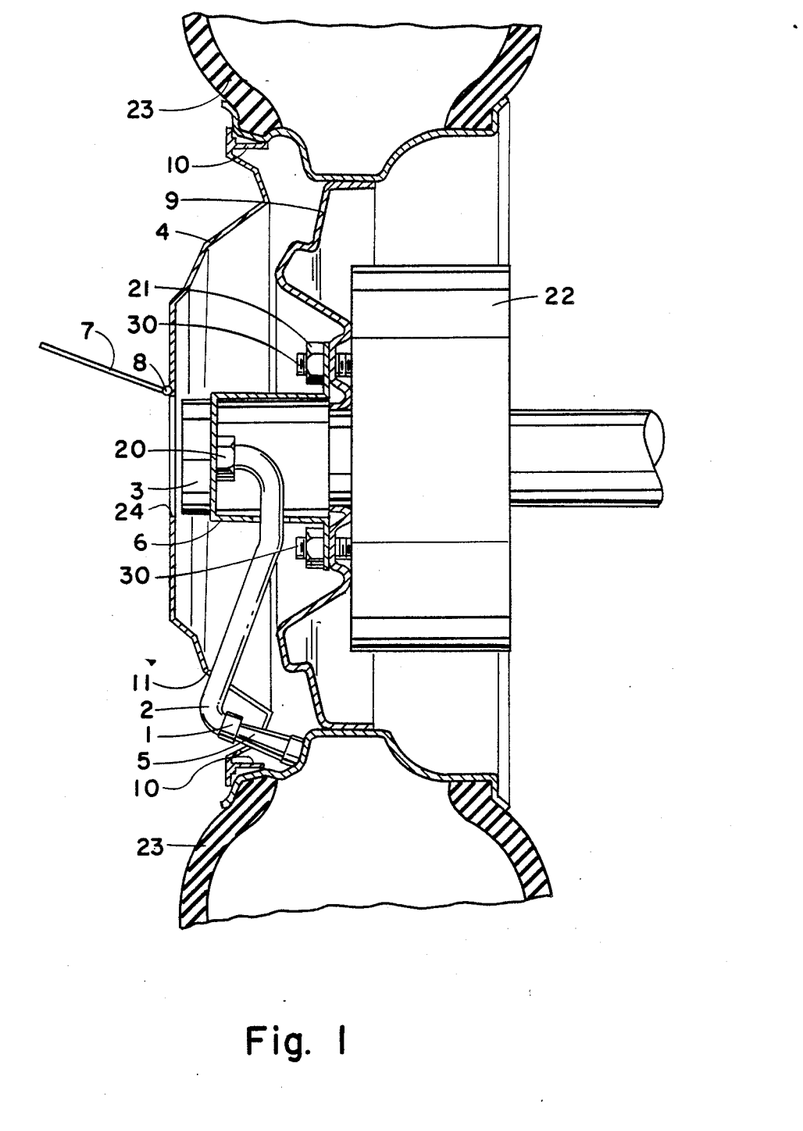
FIG. 1 is a side elevation of a pneumatic tire employing the present invention.
Figure 2:
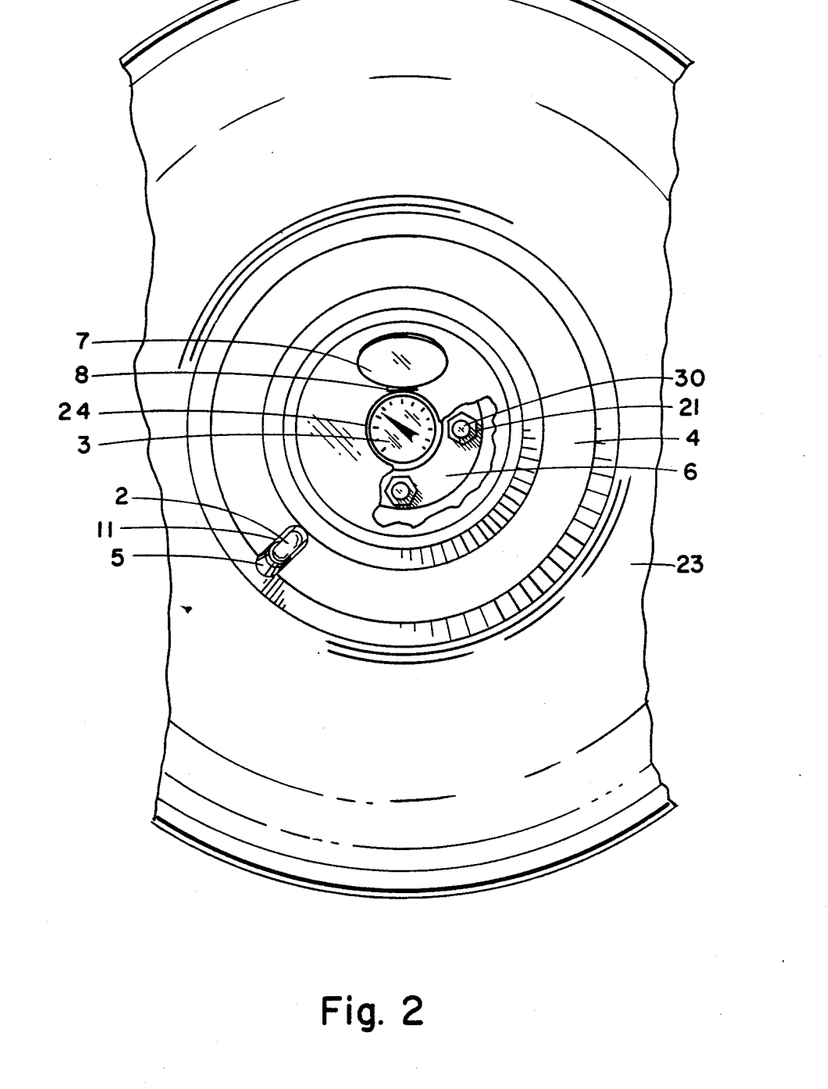
FIG. 2 is a diametrical cross section of a tire and wheel assembly embodying the present invention.
Figure 3:
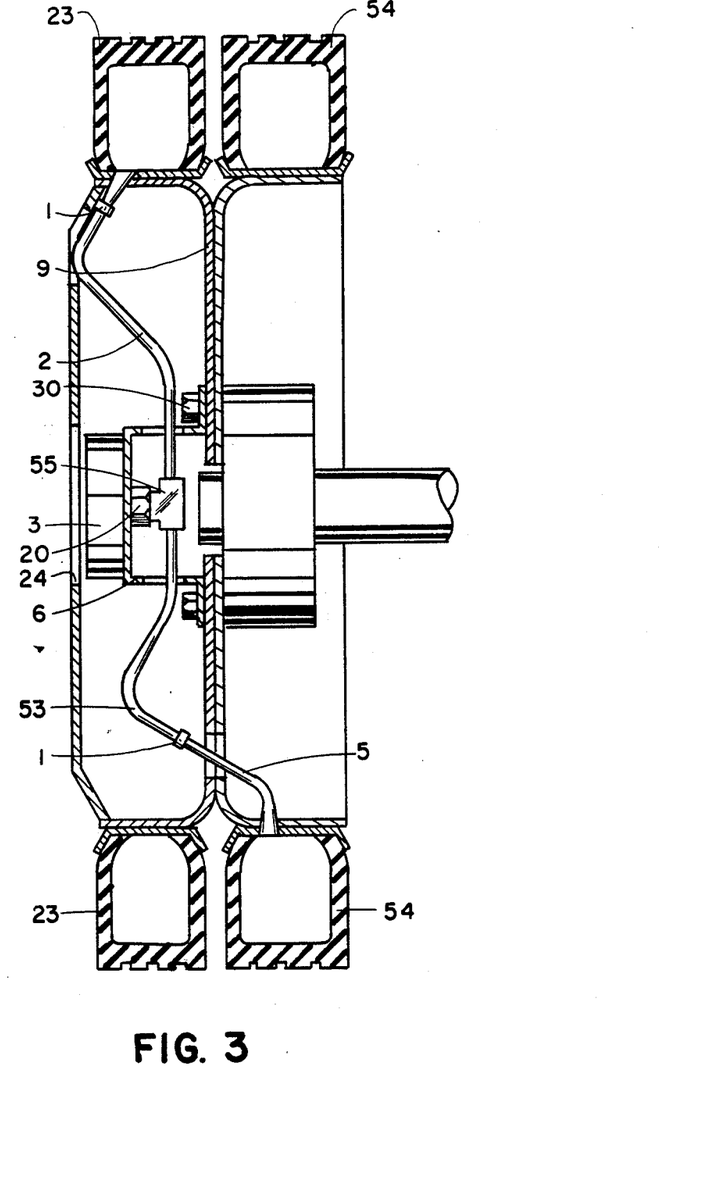
FIG. 3 is a diametrical cross section of a dual-tire and wheel assembly embodying a modification to the present invention.
Figure 5:
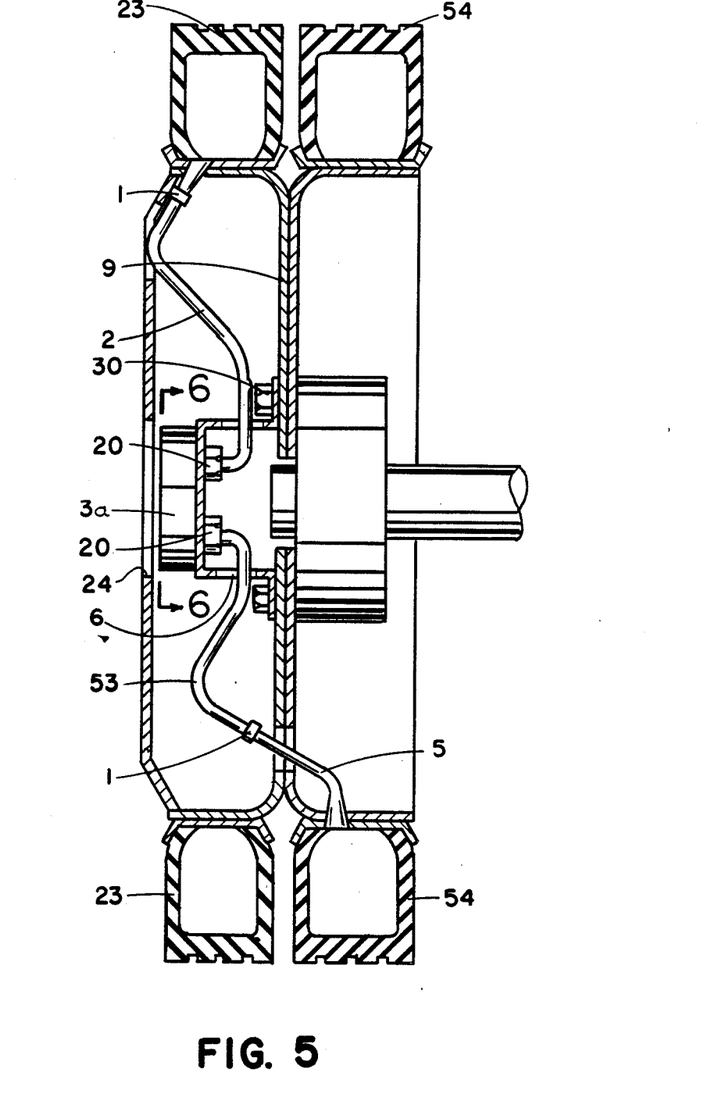
FIG. 5 is a side view of a modification of the present invention showing a dual-port gauge.
Figure 6:
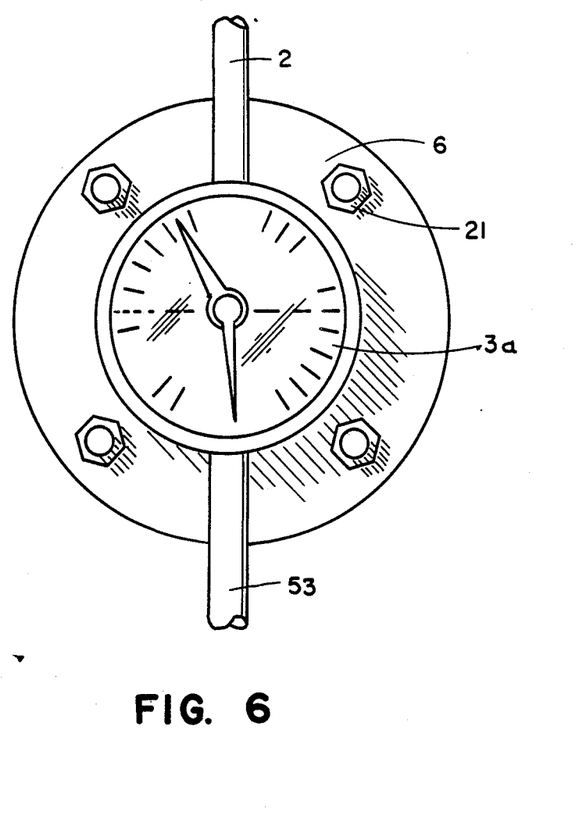
FIG. 6 is a front view of a dual-port gauge taken along the line 6—6 of FIG. 5.
Figure 7:
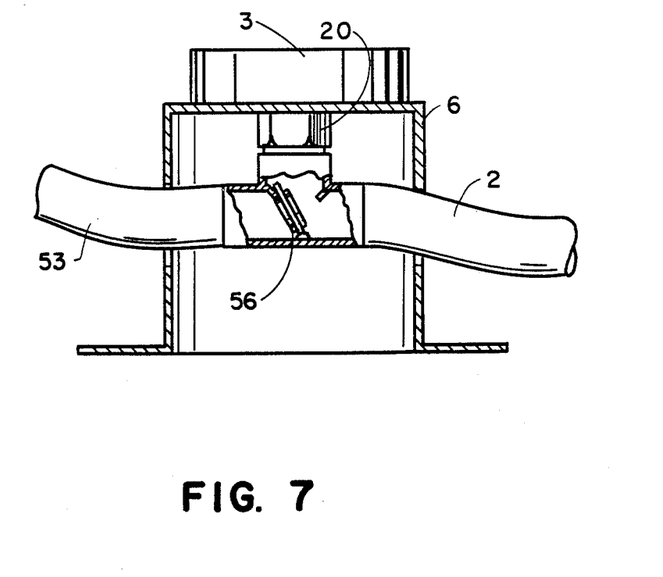
FIG. 7 is a side view of a modification to the present invention showing a manual pneumatic valve.

An important modification of the present invention is shown in FIG. 3, which allows for its use in dual-wheel application. In dual wheel applications a second pneumatic hose (53) is attached to a valve stem (5) of a second pneumatic tire (54). The opposite end of the second hose (53) may be attached to the first hose (2) via a common pneumatic "Y" or "T" fitting (55), as shown in FIG. 3; or may alternatively be attached directly to a dual-port gauge (3a), as shown in FIG. 5 and FIG. 6. In the former construction—(i.e. hose (2) is in communication with hose (53)), a manual pneumatic valve (56) may be used to isolate the pneumatic pressure of the two tires (23) and (54) from each other, as shown in FIG. 7. In the latter construction—(i.e. hoses (2) and (53) are not in pneumatic communication with each other)—a dual-input pressure gauge (3a) is used, as shown in FIG. 5 and FIG. 6, whereby the pressure of each tire (23) and (54) can be read simultaneously.

OPERATION

Mounting bracket (6) is attached to the wheel rim (9) by nuts (21) and studs (30). The bracket (6) is centered approximately along the ais of the wheel rim (9).

Pressure gauge (3) is approximately centered on the bracket (6), with the front (i.e. the face) of the gauge directed away from the wheel rim. The gauge (3) and bracket (6) are centered along the wheel's axis so as to minimize any unbalanced centrifugal loads on the wheel caused by the device and any centrifugal loads on the internal pressure-sensing and indicating components of the gauge (3) itself while the automobile is in motion. By employing nuts (21) to secure the bracket (6) to the wheel rim (9), it will be appreciated that the device can be securely attached to the automobile without necessitating any modifications to the automobile itself, and accordingly may be attached to, and removed from, any automobile wheel (22) which uses common wheel rim-mounting studs (30).

In the preferred embodiment of the invention pneumatic hose (2) is attached to the tire's valve stem (5) by a threaded female fitting (1). With fitting (1) and hose (2) connected to the valve stem (5), gauge (3) continuously senses the air pressure inside of the automobile's tire (23). The tire's air pressure, then, can be read directly from the pressure gauge (3) at any time (when the automobile is not in motion).

In the preferred embodiment of the invention a hub cap (4) is attached to the wheel rim (9) and over the gauge mounting bracket (6). Hub cap (4) is provided with an opening (24) through which the gauge (3) is visible. A second opening (11) from the outside of the hub cap (4) to the inside of the hub cap (4) through which hose (2) passes from the valve stem (5) to the gauge (3). The hub cap (4) protects the gauge mounting bracket (6) from dirt and from damage from rocks and other debris, and discourages vandalism and unwanted removal of the gauge (3) by hiding the bracket mounting lug nuts (21) from view.

Further protection of the gauge (3) is provided by a hinged cover (7) which, in the closed position, fully covers the hub cap opening (24). The hinged cover (7) may be opened manually for purpose of reading the gauge (3).

In the preferred embodiment of the invention bracket (6) is attached to the wheel rim (9) by each (typically four or five) of the wheel's stud nuts (21). However, it is noted that the present invention can be mounted to a wheel rim by using less than all of the wheel's studs (30) and nuts (21), as long as at least two of such nuts are used for this purpose.

A modification of the present invention which is adaptable for use with dual wheel applications, such as may be found on trucks and recreational vehicles, is shown in FIG. 3. This modification of the invention is similar to the preferred embodiment of the invention as described above, but additionally includes a second hose (53) which similarly attaches to the valve stem of a second tire (54). The opposite end of the second hose (53) may be connected directly to the first hose (2), as shown in FIG. 3. In this arrangement, the gauge may either sense the common pressure of the two hoses (53) and (2), or a manual pneumatic valve (56) may be used to isolate the pressure being sensed by the gauge (3) to the pneumatic pressure of either on of the two hoses (53) or (2). Alternatively, a dual-port gauge (3a) having two indicators, as shown in FIG. 6, may be used so that the pressure of both tires (23) and (54) can be read simultaneously.

While the above description contains many specificities, these should not be construed as limitations on the scope of the invention, but rather as an exemplification of one preferred embodiment thereof. Many variations are possible, for example:

the air pressure gauge (3) may have either a digital or dial face;

the face of the pressure gauge may indicate either absolute pressure, gauge pressure, or simply indicate whether the pressure is above or below a preselected range of pressures;

hose (2) may be attached to valve stem (5) by any common fitting (1) which is suitable for connection to the valve stem (5); and gauge (3) may be attached to mounting bracket (6) by other common fastening means other than a threaded nut (20) as described above.

Accordingly, the scope of the invention should be determined not by the embodiment illustrated, but by the appended claims and their legal equivalents.

I claim:

1. An air pressure measuring device for measuring the pressure of pneumatic tires mounted on lug bolt-mounted tire rims, comprising:

an air pressure gauge;

a gauge mounting member;

means for attaching said gauge to said gauge mounting member;

means for attaching said gauge mounting member to said lug bolts;
a pneumatic conduit, said pneumatic conduit being in communication with said air pressure gauge at one end and means for attaching the other end of said conduit to a valve stem of said pneumatic tire;
said gauge being disposed approximately at the centerline of said tire rim;
said means for attaching said gauge mounting member to said lug bolts comprising at least two threaded nuts;
said means for attaching said pneumatic conduit to said valve stem comprising a threaded female fitting;
a wheel rim covering member attachable to said tire rim by which said threaded nuts are enclosed between said wheel rim covering member and said tire rim;
a first opening disposed in the center of said wheel rim covering member through which said air pressure gauge is visible;
a second opening in said wheel rim covering member through which said pneumatic conduit passes;
and means for temporarily closing said first opening in said wheel rim covering member, comprising a door pivotally attached to said wheel rim covering member.

2. The invention according to claim 1 in which said air pressure gauge comprises a dial indicator.

3. An air pressure measuring device for measuring the pressure of pneumatic tires mounted on lug bolt-mounted tire rims, comprising:
an air pressure gauge;
a gauge mounting member;
means for attaching said gauge to said gauge mounting member;
means for attaching said gauge mounting member to said lug bolts;
a pneumatic conduit;
said pneumatic conduit comprising a hose a first end and a second end;
means for attaching said first end of said hose to said gauge;
means for attaching said second end of said hose directly to a valve stem extending from said pneumatic tire;
said gauge being disposed approximately at the centerline of said tire rim;
said means for attaching said gauge mounting member to said lug bolts comprising at least two threaded nuts;
and said means for attaching said second end of said conduit
directly to a valve stem of said pneumatic tire comprising a first threaded female fitting attached to said secod end of said conduit;
wherein said gauge has a front surface and a back surface, and said means for attaching said gauge to said gauge mounting member comprises a second threaded fitting disposed on the back of said gauge; and
wherein said threaded fitting disposed on the back of said gauge is centered approximately on the axis of said tire rim;
and further comprising a wheel rim covering member attachable to said tire rim by which said threaded nuts are disposed between said wheel rim covering member and said tire rim;
said wheel rim covering member having an inside surface generally facing toward said tire rim, and an outside surface generally facing away from said tire rim;
a first opening disposed in the center of said wheel rim covering member through which said air pressure gauge is visible from the outside of said wheel rim covering member;
and, a second opening in said wheel rim covering member through which said hose passes;
and wherein said front surface of said gauge is disposed between said outside surface of said wheel rim covering member and said lug bolts.

4. The invention according to claim 3, further comprising means for temporarily closing said first opening in said wheel rim covering member, said means comprising a door pivotally attached to said wheel rim covering member.

5. An air pressure measuring device for measuring the pressure of pneumatic tires mounted on lug bolt-mounted tire rims comprising:
an air pressure gauge;
a gauge mounting member;
means for attaching said gauge to said gauge mounting member;
means for attaching said gauge mounting member to said lug bolts;
a first pneumatic conduit;
said first pneumatic conduit having a first end and a second end;
means for attaching said first end of said first pneumatic conduit to said gauge;
means for attaching said second end of said first pneumatic conduit to a valve stem extending from a first pneumatic tire;
said gauge being disposed approximately at the axial centerline of said first pneumatic tire;
said means for attaching said gauge mounting member to said lug bolts comprising at least two threaded nuts;
wherein said gauge has a front surface and a back surface, and said means for attaching said gauge to said gauge mounting member comprises a threaded fitting disposed on the back of said gauge;
and further comprising a wheel rim covering member attachable to said tire rim by which said threaded nuts are disposed between said wheel rim covering member and said tire rim of said first pneumatic tire;
said wheel rim covering member having an inside surface generally facing toward said tire rim, and an outside surface generally facing away from said tire rim;
a first opening disposed in the center of said wheel rim covering member through which said air pressure gauge is visible from the outside of said wheel rim covering member;
and wherein said front surface of said gauge is disposed between said outside surface of said wheel rim covering member and said lug bolts.

6. The device according to claim 5, further comprising a second opening in said wheel rim covering member through which said first pneumatic conduit passes.

7. the device according to claim 5 wherein said means for attaching said end of said first pneumatic conduit to said gauge comprises a first threaded fitting disposed on the back of said gauge.

8. the device according to claim 7, wherein said first threaded fitting is centered approximately on the axis of said first pneumatic tire.

9. The device according to claim 7, further comprising:
   a second pneumatic conduit having a first end and a second end;
   means for attaching said first end of said second pneumatic conduit to said air pressure gauge;
   and means for attaching said second end of said second pneumatic conduit to a valve stem extending for a second pneumatic tire.

10. The device according to claim 5 further comprising:
   a first orifice intermediately disposed in said first pneumatic conduit, through which orifice said air pressure may be introduce into said
   first pneumatic conduit;
   and a removable orifice-sealing member, by which said orifice may be alternatively opened and closed.

11. An air pressure measuring device for measuring the pressure of pneumatic tires mounted on lug bolt-mounted tire rims comprising:
   first and second air pressure gauges;
   a gauge mounting member;
   means for attaching said first and second air pressure gauges to said gauge mounting member;
   means for attaching said gauge mounting member to said lug bolts;
   a first pneumatic conduit;
   said first pneumatic conduit having a first end and a second end;
   means for attaching said first end of said first pneumatic conduit to said first gauge;
   means for attaching said second end of said first pneumatic conduit to a valve stem extending from a first pneumatic tire;
   said gauge being disposed approximately at the axial centerline of said first pneumatic tire;
   said means for attaching said gauge mounting member to said lug bolts comprising at least two threaded nuts;
   wherein said first gauge has a front surface and a back surface;
   and further comprising a wheel rim covering member attachable to said tire rim by which said threaded nuts are disposed between said wheel rim covering member and said tire rim of said first pneumatic tire;
   said wheel rim covering member having an inside surface generally facing toward said tire rim, and an outside surface generally facing away from said tire rim;
   a first opening disposed in the center of said wheel rim covering member through which said first and second air pressure gauges are visible from the outside of said wheel rim covering member;
   and wherein said front surface of said first gauge is disposed between said outside surface of said wheel rim covering member and said lug bolts.

* * * * *